United States Patent
Wu et al.

(10) Patent No.: US 11,884,563 B1
(45) Date of Patent: Jan. 30, 2024

(54) LIGNIN FLOCCULES AS CLEANING AGENTS FOR OIL-CONTAMINATED MATERIALS

(71) Applicants: Qinglin Wu, Baton Rouge, LA (US); Pawan Kumar Mishra, Brno (CZ)

(72) Inventors: Qinglin Wu, Baton Rouge, LA (US); Pawan Kumar Mishra, Brno (CZ)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 28 days.

(21) Appl. No.: 17/690,049

(22) Filed: Mar. 9, 2022

Related U.S. Application Data

(60) Provisional application No. 63/160,039, filed on Mar. 12, 2021.

(51) Int. Cl.
| | |
|---|---|
| *C02F 1/56* | (2023.01) |
| *B01J 20/24* | (2006.01) |
| *C02F 1/52* | (2023.01) |
| *C02F 1/68* | (2023.01) |
| *B01J 20/28* | (2006.01) |
| *C02F 101/32* | (2006.01) |
| *C02F 103/00* | (2006.01) |
| *C02F 103/08* | (2006.01) |
| *E02B 15/04* | (2006.01) |

(52) U.S. Cl.
CPC ............... *C02F 1/56* (2013.01); *B01J 20/24* (2013.01); *C02F 1/5227* (2013.01); *C02F 1/681* (2013.01); *B01J 20/28023* (2013.01); *B01J 2220/4831* (2013.01); *C02F 2101/32* (2013.01); *C02F 2103/007* (2013.01); *C02F 2103/08* (2013.01); *C02F 2305/14* (2013.01); *E02B 15/04* (2013.01); *Y02W 30/62* (2015.05)

(58) Field of Classification Search
None
See application file for complete search history.

(56) References Cited

U.S. PATENT DOCUMENTS 4,234,379 A * 11/1980 Conway .................. D21B 1/12
162/146

FOREIGN PATENT DOCUMENTS

WO    WO-2020072735 A1 *  4/2020  ......... B01D 17/0202

OTHER PUBLICATIONS

Delgado-Aguilar et al. (Industrial Crops and Products, 2016, 86, 295-300). (Year: 2016).*
Lehigh, pp. 1-2, 2011, accessed online at https://ei.lehigh.edu/envirosci/watershed/wq/wqbackground/chloridebg.html#:~: text=Brackish%20water%20has%20a%20chloride, 1%2C000%2D10%2C000%20mg%2FL. (Year: 2011).*
A. Alassod, "Polypropylene/Lignin Blend Monoliths Used as Sorbent in Oil Spill Cleanup," *Heliyon*, vol. 6, e04591 (2020).
A. Hyde et al., "General Principles and Strategies for Salting-Out Informed by the Hofmeister Series," *Organic Process Research & Development*, vol. 21, pp. 1355-1370 (2017).
J. Lee et al., "Binding of Lignin Nanoparticles at Oil-Water Interfaces: An Ecofriendly Alternative to Oil Spill Recovery," *ACS Applied Materials & Interfaces*, vol. 10, pp. 43282-43289 (2018).

* cited by examiner

*Primary Examiner* — Clare M Perrin
(74) *Attorney, Agent, or Firm* — John H. Runnels

(57) ABSTRACT

A composition and method are disclosed for forming lignin-containing floccules from dissolved lignin, lignin nanoparticles, lignin colloids, or lignin-containing cellulose nanofibers. The floccules may be used to clean oil-contaminated materials such as oil-contaminated plastics or oil-contaminated water. The polymers and oil may then be recovered for further use, without requiring organic solvents.

15 Claims, No Drawings

LIGNIN FLOCCULES AS CLEANING AGENTS FOR OIL-CONTAMINATED MATERIALS

The benefit of the Mar. 12, 2021 filing date of U.S. provisional patent application Ser. No. 63/160,039 is claimed under 35 U.S.C. § 119(e).

The development of this invention was funded by the United States Government under Grant 16-JV-11111106-052 awarded by the United States Department of Agriculture/Forest Service. The United States Government has certain rights in this invention.

TECHNICAL FIELD

This invention pertains to cleaning oil-contaminated materials such as oil-contaminated plastics or oil-contaminated water; for example, cleaning used high-density polyethylene motor oil containers, or cleaning water contaminated by an oil spill.

BACKGROUND

Pollution from used plastics presents a significant economic, social, and environmental problem. For example, the U.S. recycled only about 9 percent of its plastic waste in 2015. Since then, the percentage has dropped even lower, especially after China stopped importing most waste plastic material. Less than 1 percent of the tens of billions of plastic bags used in the U.S. each year are recycled. Overall, the vast majority of the 8.3 billion metric tons of plastic ever produced (viz., 79 percent of it) has ended up in landfills or scattered all around the world, polluting air (micro/nano plastics), land, rivers, and oceans. Among various types of used plastics, plastic containers for paints, automotive fluids, and pesticides pose a particular problem for recycling. They must be disposed of separately or, at some facilities, cleaned before they can be recycled. When the level of contaminants in a load of used plastics becomes too high for recycling, all items are usually sent to a landfill, even though a portion would be recyclable.

High-density polyethylene (HDPE) containers are commonly used to hold motor oil in quart or gallon sizes (~0.95 liters or ~3.78 liters). An estimated 150,000 tons of HDPE waste containers are produced annually in the United States alone, and more is produced in other countries. On average, each disposed container is contaminated with about 20 g of motor oil, present both as bulk liquid and as a coating of the container interior, totaling about 60,000 metric tons (20 million gallons) of motor oil residue annually in the United States alone. This residual oil is not only an environmental contaminant in its own regard; but it also typically prevents re-use of the polymer for other purposes. Indeed, most plastic recycling programs will not accept empty motor oil containers. A similar problem exists with containers made from other polymers, for example, polypropylene ("PP"), or polyvinyl chloride ("PVC"), or that contain different types of oil, such as other petroleum products or cooking oil. After use, these oil-contaminated containers typically become waste for which there exist no suitable recycling options, and which are therefore often landfilled.

Used HDPE motor oil containers may not merely be recycled by traditional means into new motor oil containers. This seemingly simple solution faces a substantial problem, namely, that the blow-molding process typically used in manufacturing HDPE containers requires high melt-flow characteristics, and hence employs temperatures above 200° C. At these elevated temperatures, there is significant thermal degradation of oil residues, which imparts a strong, oily odor to the recycled polymer, severely limiting its use. Some prior approaches have relied on cleaning used motor oil containers prior to recycling the polymer, with cleaning methods that have included: (a) using supercritical water to displace the oil from the polymer; (b) using a halogenated solvent to displace the oil from the polymer; (c) using non-halogenated (combustible) solvents to displace oil from the polymer; or (d) blowing out the residual oil using heated air or supercritical carbon dioxide. Such processes are difficult to implement on a commercial scale, they are energy-intensive, and they tend to create other waste products. Used motor oil can have a profound environmental impact—one gallon of motor oil has the potential to contaminate up to one million gallons of water. The current alternative to recycling, namely placement in a landfill, is unattractive. It takes an estimated 1,000 years for an HDPE motor oil container to decompose. Concerns about oil release into the soil and groundwater have prompted numerous city and county governments to prohibit motor oil containers in landfill. If the oil-contaminated containers could be properly and economically cleaned, then their plastics and oil could be recovered and reused.

Oil contamination of water poses another significant problem. Oceans are polluted daily by oil from oil spills, routine shipping, run-offs, and dumping. Oil spills cause a localized problem that can be catastrophic to local marine wildlife including fish, birds, dolphins, whales, and sea otters. Oil does not dissolve in water and instead forms a thick sludge. The sludge suffocates fish, gets caught in the feathers of birds, stopping them from flying, and blocks light from reaching photosynthetic aquatic plants. Another source of water pollution is oil and gas industrial, exploration, and operational discharge, accidental spillage, or improperly disposed drilling wastes, which have serious detrimental effects on humans and the environment. When oil and gas drilling fluids and cuttings are disposed on the ground surface, the liquid fraction of the disposed waste seeps through the ground, and eventually can harm living organisms in the ground and pollute groundwater. Consequently, oil-based drilling fluids and associated drill cuttings present a significant challenge to the industry, where the goal is compliance with requirements for zero discharge. Cost effective and environmentally friendly technologies for cleaning oil-contaminated water are currently not readily available.

A. Hyde et al., "General Principles and Strategies for Salting-Out Informed by the Hofmeister Series," *Organic Process Research & Development*, vol. 21, pp. 1355-1370 (2017) provides an overview of salting-out processes, along with some specific examples.

J. Lee et al., "Binding of Lignin Nanoparticles at Oil-Water Interfaces: An Ecofriendly Alternative to Oil Spill Recovery," *ACS Applied Materials & Interfaces*, vol. 10, pp. 43282-43289 (2018) discloses the use of a mixture of lignin nanoparticles and 1-pentanol for recovery of oil in an oil spill. The pentanol in the mixture generates initial Marangoni flow and confines the spilled oil into a thick slick on the surface of water. While the alcohol solubilizes, lignin nanoparticles irreversibly adsorb onto the oil-water interface.

A. Alassod, "Polypropylene/Lignin Blend Monoliths Used as Sorbent in Oil Spill Cleanup," *Heliyon*, vol. 6, e04591 (2020) discloses the use of polypropylene/lignin blends formed through thermally induced phase separation for oil absorption, for example in cleaning oil spills.

There remains an unfilled need for improved methods to facilitate cleaning oil-contaminated materials, such as oil-contaminated plastics and oil-contaminated water, to recover valuable resources and to reduce environmental impact.

SUMMARY OF THE INVENTION

We have discovered a composition and method for cleaning oil-contaminated materials, such as oil-contaminated plastics and oil-contaminated water, in an energy-efficient manner. The composition comprises lignin-based floccules in a water-based carrier fluid. The composition may be used for example, for cleaning used high-density polyethylene (HDPE) motor oil containers containing residual motor oil, or for cleaning contaminated water after an oil spill. The composition comprises three principal components: lignin, one or more flocculants, and one or more carrier fluids. The lignin is dissolved in a carrier solvent, or is in particulate form suspended in water or other carrier fluid, or both. The one or more flocculants may for example comprise salts, polyelectrolytes, or other flocculants known in the art.

One embodiment of the invention employs commercial Kraft lignin dissolved in ethanol; the lignin solution is added to a salt solution, forming a flocculated suspension under controlled pH conditions through a salting-out process, with the salt playing a dual role as flocculent.

In another embodiment, lignin nanoparticles are formed through mechanical grinding, microfluidizing, and ultrasonication of micro-size commercial Kraft lignin from a paper mill. The resulting nanoparticles are suspended in a water-based carrier fluid using a flocculant (salt), and flocculated suspensions are formed under controlled pH conditions through self-assembly of the lignin particles.

In another embodiment, lignin-containing cellulose nanofibers (LCNFs) are manufactured from southern pine tree bark through mechanical grinding and microfluidizing. The LCNFs are suspended in a water-based carrier fluid using a flocculent (salt), and flocculated suspensions are formed under controlled pH conditions through self-assembly of the lignin particles in the LCNF suspension.

Optionally, lignin floccules may be produced by two or more of these embodiments in combination, simultaneously or in parallel.

Salting-out involves a decrease in the lignin solubility via anions of high charge density, through a combination of electrostatic repulsion and enhanced hydrophobic effects. Hydrophobic effects promote the self-assembly of lignin chains, to help reduce the entropy penalty associated with a highly-ordered structure at the lignin-water interface. In the presence of high-charge-density ions, lignin-lignin interactions are promoted. The solvated condition then becomes disfavored, leading to self-assembled nano/colloidal size lignin particles.

Lignin floccules are formed from lignin particles (i.e., from lignin particles precipitated from lignin solution, lignin nanoparticles, or both) in the presence of a flocculant (typically an electrolyte). At higher electrolyte concentrations, both anions and cations interact with lignin particles. With a negative surface charge on the lignin particle, oppositely charged cations surround the particle, leading to the formation of a cationic Stern layer. The ions from the electrolyte contribute to the diffuse layer, and neutralize the negative charge on lignin particles. This negative charge is otherwise responsible for particle-particle repulsion and would otherwise inhibit aggregation. Flocculation is also promoted by Brownian motion and Van der Waals forces. An important role is played by the ionic strength of the salt solution as it compresses the electric double layer around the lignin particles, and thereby facilitates flocculation by non-covalent interactions between particles.

Lignin is amphiphilic, and can therefore accumulate at the oil-water interface, making it well-suited for cleaning oil-contaminated plastics or water. For example, lignin floccules can be used in washing fluids for cleaning an oil-coated plastic container. The ability of lignin floccules to bond to the oil helps strip oil from the plastic container's inner surface, thus forming an oil-lignin-water suspension. The oil-lignin floccule assembly has a density less that of water, so that the assembly floats upward in the mixture. At the end, the lignin-oil mixture sits on the top of the water. Heat can be applied to the mixture to induce an auto-condensation process, whereby lignin assembles to form a dense interface layer between oil and water. Further heating leads to the formation of a lignin-oil-complex cake that can be easily separated. This process provides a way to separate the oil from water such that oil (and lignin) can be recovered, and the cleaned water can be recycled back to the washing process.

The novel lignin-based floccules have unique properties. The system is water-based, and can eliminate (or reduce) the use of potentially toxic organic solvents when cleaning oil-contaminated plastics and water. The lignin raw material can be obtained from what would otherwise be a waste stream, such as so-called "black liquor" at paper mills. With heating, the lignin floccules form an interface layer between oil and water to separate the oil from water effectively. The oil-lignin complex cake can be recovered from the water surface. The recovered cake can be burned for heating purposes. The water stream can be recovered and reused. The cleaned polymer can be molded for composite or other recycling applications. When the lignin material is applied to oil-contaminated sea water (e.g., sea water after oil spill), the salt in the seawater can serve as the flocculant, and lignin floccules can form in-situ as an oil herding agent.

The novel composition may generally be used for applications where polymers are contaminated, and cleaning is needed for further processing to recover valuable polymers, oil, or both; and for applications where water is contaminated with oil such as wastewater from the oil field, or and seawater contaminated by an oil spill.

MODES FOR CARRYING OUT THE INVENTION

Examples 1-10 Forming Lignin Floccules from Dissolved Lignin

To form lignin floccules from dissolved lignin, salting-out and flocculation processes were used. In a typical procedure, commercially-purchased Kraft lignin was dissolved in ethanol (96% purity) with constant stirring to form a 0.5 wt % clear solution. Two parts of the lignin-ethanol solution were added to 18 parts of a (5.85%) NaCl aqueous solution, so that there was 0.05 wt % lignin in the resulting composition. The pH of the mixture was adjusted to 5 with HCl. After being shaken, the solution was allowed to rest, and lignin particles predominantly in the size range 100-3000 nm were observed (from salting out). These lignin particles then self-assembled into larger groups, to form lignin floccules in a size range of 200-500 microns.

To better understand the salting-out process and the effects of pH and salt concentration, 3 ml of 0.5% lignin solution in ethanol were added to 20 mL of water at different combinations of salt and pH (total 0.05% lignin in the final composition). See Table 1. Each suspension flocculated first. The flocculated suspension was allowed to rest until all floccules had settled down (up to 4 days) and a clear supernatant was observed. A sample was taken from the supernatant from each suspension and was tested for UV-Vis absorbance (UV-Visible spectrophotometer, Evolution 600, Thermo Fischer Scientific, Waltham, Massachusetts, U.S.A.). Absorbance at 207 nm was used to assay the amount of lignin in the solution (i.e., the outcome of the salting-out process). Table 1 shows the test data. Higher absorbance values indicate more lignin in the supernatant (i.e., less lignin had salted out). As shown, less lignin salting-out occurred at pH=7 (larger absorbance values). As the suspension was made more acidic (reduced pH value leading to reduced lignin solubility), more lignin was precipitated/salted-out (reduced absorbance value). A synergistic effect of pH and salt concentration was observed: for example, the observed absorbance was similar at pH 3 with no salt and at pH 5 with 1-1.5 molal salt concentration. Also, at pH=3 or 5, less salt was needed to salt out a given amount of lignin as compared with pH=7, due to the decreased solubility of lignin at lower pH. However, pH=3 is less desirable because such acidity is generally more corrosive. A pH of about 5 is less corrosive and salting out occurs at comparable salt concentrations.

Test data on redispersing time (RT: time taken to disperse the suspension at a certain shaking speed on a shaker) further support the observations from the SV data. Below 1.5 m salt concentration, flocculated suspensions were formed as indicated by low RT values. However, further increasing the salt concentration led to deflocculated suspensions as indicated by much higher RT values. Thus, both pH and salt content affect the lignin flocculation process. The preferred formulations are at acidic conditions (preferably pH 5 or around pH 5) and below 2 m salt concentration.

Lignin floccule formation was also observed with a dynamic light scattering particle size analyzer (MicroTrac S3500 Montgomeryville and York, Pennsylvania, U.S.A.) with a composition containing 0.05% lignin, pH 5, and 1 m salt (NaCl). The lignin particle size in the formulation was measured at time=0, 2, 5, 10, and 20 minutes after sonication. Data on floccule size and floccule volume percentage as a function of time are presented in Table 2. The flocculation kinetics experiments suggest that at time t=0 (immediately after the sonication), there was a unimodal distribution of particle size with a mean diameter around 3.96 μm. Over time, the floccules grew, and a bimodal size distribu-

TABLE 1

Effect of pH and Salt content on the salting-out of lignin from solution

| | Molality of salt solution (molal or m) | | | | | | |
|---|---|---|---|---|---|---|---|
| Parameter | 0 | 0.5 | 1 | 1.5 | 2 | 2.5 | 3.0 |
| UVA pH7 (AU) | 2.101 | 1.006 | 0.878 | 0.786 | 0.787 | 0.799 | 0.682 |
| UVA pH5 (AU) | 2.052 | 0.571 | 0.466 | 0.458 | 0.443 | 0.427 | 0.406 |
| UVA pH3 (AU) | 0.453 | 0.448 | 0.441 | 0.407 | 0.382 | 0.345 | 0.331 |
| SV pH5 (dimensionless) | — | 11.1 | 11.3 | 11.8 | 5.6 | 4.9 | 4.3 |
| SV pH3 (dimensionless) | — | 12.3 | 13.1 | 12.6 | 4.8 | 5.2 | 4.7 |
| RT pH 5 (min) | — | 1.6 | 1.3 | 1.4 | 10.3 | 9.6 | 10.5 |
| RT pH 3 (min) | — | 1.8 | 1.5 | 1.6 | 8.6 | 8.3 | 8.9 |

RT = Redispersing time;
SV = sedimentation volume;
UVA = UV absorbance at 207 nm in Absorbance Units (AU).

Sedimentation volume (i.e., the ratio of the final settled-down volume of the floccules to initial volume of the stable suspension) was measured and compared at pH=5 and 3 (Table 1). Below 1.5 M salt concentration, flocculated suspensions were formed as indicated by high SV values. However, further increasing the salt concentration led to deflocculated suspensions as indicated by the much-reduced SV values. Upon the addition of salt, the negative charge on the lignin surface was neutralized, allowing flocculation to occur. However, further increase of the salt content reversed the effect on the surface charge, leading to deflocculation.

tion developed. After 2 minutes, two peaks were observed with mean diameters at 4.1 μm and 2.74 μm. The same trends continued until 5 minutes with bimodal distribution, and two peaks with particle sizes of 4.15 and 2.77 μm. The time up to about 5 minutes represents the initial stage of floccule growth. After 10 minutes, large floccules started to appear, and there was a multimodal size distribution with peaks around 300, 99, 42, and 4.7 μm. At t=20 minutes, large floccules with sizes up to 1100 μm were observed.

TABLE 2

Dynamic light scattering data on lignin floccules

| Time | Particle Diameter (μm)/Vol. % | | | | |
|---|---|---|---|---|---|
| (Min.) | Peak 1 | Peak 2 | Peak 3 | Peak 4 | Peak 5 |
| 0 | 3.96/100 | 0/0 | 0/0 | 0/0 | |
| 2 | 4.15/59.5 | 2.77/40.50 | 0/0 | 0/0 | |
| 5 | 4.10/53.7 | 2.74/46.30 | 0/0 | 0/0 | |
| 10 | 303.80/23.70 | 99.01/9.90 | 42.31/1.60 | 4.7/37.20 | 2.61/27.6 |
| 20 | 1101.00/66 | 136/7.50 | 3.18/26.00 | 0/0 | |

The morphology of the floccules was observed with field emission scanning electron microscopy (FE-SEM, FEI Quanta3D FEG Dual-Beam SEM, FIB system Hillsboro, Oregon, U.S.A.) at 20 kV accelerating voltage. Before observations, all samples were deposited on carbon tape that had previously been mounted onto aluminum stubs, and sputter-coated with gold for 2 min. The floccules typically contained several individual lignin particles. The smaller-size floccules were characteristic of a simple salt-flocculated suspension, while larger floccules formed when a polyelectrolyte such as polyacrylamide or alginate was used. A high salt concentration used for a one-step flocculation led to smaller floccule formation (as compared to the particle size measurement), along with deposition and growth of salt crystals on the floccule surface.

Optical microscope images of dissolved lignin floccules with oil were taken using a Leica DM6B upright microscope (Leica Microsystems Inc., Buffalo Grove, IL, USA) to observe the association of oil droplets with lignin floccules. We observed oil droplets trapped in the floccules by microscopy.

Examples 11-20: Forming Lignin Floccules from Lignin Particles

Lignin floccules were formed from lignin nanoparticles directly, either from ground commercial Kraft lignin, or from lignin-containing cellulose nanofiber suspensions. To form lignin floccules from ground lignin particles, commercially-purchased Kraft lignin was used to form a 2 wt % lignin-water suspension. The processed suspension was wet-ground with a MKCA6-2J supermass-colloider for five passes, and then homogenized with a model M-110EH-30 microfluidics machine (Microfluidics Corp., Newton, MA, USA) at 208 MPa pressure for five passes. The final material formed a stable suspension. The size range of lignin particles in the suspension was predominantly from about 100 nm to about 2000 nm. The lignin-water suspension was adjusted to 0.5 wt % concentration. Two parts of the lignin-water suspension were added to 18 parts of a 1 m (5.85%) NaCl solution, so that there was 0.05 wt % lignin in the resulting composition. The pH of the mixture was adjusted to 5 with HCl. After being shaken, the solution was allowed to rest, and the lignin particles self-assembled to form lignin floccules in a size range predominantly 200-500 microns.

Southern pine bark material was used to prepare lignin floccules with lignin-containing cellulose nanofibers (LCNF). The raw bark material was washed, dried, and ground with a high-speed rotor mill to about 40 mesh particle size. The obtained powder material was used to prepare 1.5 wt % suspensions in 1% NaOH by stirring for 1 hour at 90° C. to swell the material and to remove some lower molecular weight materials. The suspension was washed with distilled water. Then the processed suspension was wet-ground with an MKCA6-2J supermass-colloider for five passes, and homogenized with an M-110EH-30 microfluidics machine (Microfluidics Corp., Newton, MA, USA) at 208 MPa pressure for five passes. The final material (LCNF) formed a stable suspension. The lignin content in the suspension was measured to be 50%. An LCNF sample was taken and added to a 1 m (5.85%) NaCl solution to a final concentration of 0.05 wt % lignin. The pH of the mixture was adjusted to 5 with HCl. After being shaken, the suspension was allowed to rest, and the lignin particles self-assembled to form lignin floccules predominantly in a size range 200-500 microns.

To study the effect of pH and salt concentration on the flocculation process for lignin nanoparticle based formulations (ground lignin and LCNFs), 2 mL of 0.5% LCNFs were added to 20 mL of water at different combinations of salt and pH (to a final concentration of 0.05% lignin). See Table 3. Each suspension flocculated first. The flocculated suspension was allowed to rest until all floccules settled down (up to 4 days) and a clear supernatant was observed. A sample was taken from the supernatant from each suspension, and the supernatant was tested for UV-Vis absorbance (UV-Visible spectrophotometer, Evolution 600, Thermo Fischer Scientific, Waltham, Massachusetts, U.S.A.). Absorbance at 207 nm was used to assay the amount of lignin in the solution (i.e., salting-out process). Table 3 shows the test data. Higher absorbance values indicate more lignin in the supernatant (less lignin salting out). As shown, less lignin salting-out occurred at pH=7 (higher absorbance values). As the suspension was made more acidic, more lignin precipitated due to the lower solubility of lignin at acidic pH (lower absorbance value). A synergistic effect between pH and salt concentration was observed. For example, at both pH=3 and pH=5, less salt was needed to salt out the same amount of lignin, as compared with pH=7. However, pH=3 is less desirable because of the corrosive nature of the acid. A similar effect can be achieved at pH=5 using somewhat more salt.

TABLE 3

Effect of pH and Salt content on the flocculation process of lignin nanoparticles

| | Molality of salt solution (molal or m) | | | | | | | |
|---|---|---|---|---|---|---|---|---|
| Parameter | 0 | 0.25 | 0.5 | 1 | 1.5 | 2 | 2.5 | 3 |
| UV pH7 | 1.33 | 1.025 | 0.521 | 0.317 | 0.216 | 0.251 | 0.185 | 0.019 |
| UV pH5 | 1.62 | 1.251 | 0.43 | 0.236 | 0.087 | 0.303 | 0.271 | 0.154 |
| SV pH7 | — | 0.35 | 0.3525 | 0.355 | 0.1525 | 0.155 | 0.1525 | 0.1525 |
| SV pH5 | — | 0.4025 | 0.405 | 0.405 | 0.1475 | 0.14 | 0.135 | 0.1325 |
| RT pH 7 (min) | — | 0.9 | 0.9 | 1.1 | 14.8 | 14.3 | 14.6 | 14.8 |
| RT pH 5 (min) | — | 1.2 | 1.1 | 1.2 | 14.2 | 14.8 | 14.6 | 14.5 |

RT = Redispersing time;
SV = sedimentation volume;
UV = absorbance at 207 nm.

Sedimentation volume (i.e., the ratio of the final settled-down volume of the floccules to the initial volume of the stable suspension) was compared at pH=5 and 3 (Table 3). Below 1.0 m salt concentration, flocculated suspensions were formed as indicated by high SV values. However, further increasing the salt concentration led to deflocculated suspensions as indicated by reduced SV values. With added salt, the negative surface charge of lignin was neutralized, allowing flocculation to occur. However, the surface charge effect was reversed with excess salt in the suspension, leading to deflocculation. Test data on redispersing time (RT=time-taken to disperse the suspension at a certain shaking speed) further support the SV observations. Below 1.0 m salt concentration, flocculated suspensions were formed, as indicated by low RT values. However, further increasing the salt concentration led to deflocculated suspensions, as indicated by much higher RT values. Thus, both pH and salt content affect the lignin flocculation process from lignin particles in the LCNF system. The preferred LCNF based formulations are at acidic conditions (preferably around pH 5), and less than 1.5 m salt content.

Optical microscopy images of LCNF based floccules were taken with a Leica DM6 B upright microscope (Leica Microsystems Inc., Buffalo Grove, IL, USA). The morphology of the flocculated LCNF was observed with a transmission electron microscope (JEM 1400, JEOL USA, Peabody, MA Inc.), operating at an accelerating voltage of 120 kV. A droplet of diluted suspensions (0.02 wt %) was deposited on a glow-discharge treated copper grid. Then the samples were stained with 2 wt % uranyl acetate solution for 3 min. Relatively large micron-sized LCNF floccules were observed, and nanosized fibers were associated with the lignin particles.

Optical microscope images of LCNF floccules with oil were taken using a Leica DM6B upright microscope (Leica Microsystems Inc., Buffalo Grove, IL, USA) to observe the association of oil droplets with lignin floccules. Microscopy images showed large, trapped oil droplets in the floccules.

Examples 21-24. Washing Model HDPE Containers Containing Motor Oil

Small clear HDPE bottles were used in a model oil-container washing study using four washing fluids (control, dissolved lignin floccules—DLFs, nano-lignin floccules—NLFs, and LCNF floccules—LCNFFs). The control fluid contained water and salt (1 m or 5.85%) at pH=5, and the other three fluids were formed as described in the above examples. Each formulation contained 1 m or 5.85% salt and 0.05% lignin, and the pH was adjusted to 5 with HCl. The bottles (30 ml capacity) were purchased from Amazon.com. Each clean bottle weighed about 3.90 grams on average. An average of 1.77, 2.36, 2.38, and 2.10 grams of motor oil was added to the control, DLF, NLF, and LCNFF groups (five bottles per group), respectively. Oil content relative to the clean bottle weights was 45.27, 60.91, 61.32, and 53.97% for control, DLF, NLF and LCNFF groups, respectively. All bottles were shaken vigorously for 10 seconds to allow the oil to coat the interior surface of the bottle. The bottles were washed twice. During the first wash, 20 mL of each formulation was added to each bottle and vortexed for 20 seconds. During the second wash, 10 mL of formulation was used for vortex mixing for 10 seconds. Each bottle was then rinsed with tap water and dried overnight in an oven at 60° C. to remove residual water. The bottle weight (clean, after oil addition, after washing/rinsing, and after oven-drying) was used to calculate washing efficiency for the different formulations. See Table 4.

TABLE 4

Test data for washing model HDPE bottles coated with motor oil

| Washing Fluids | Before Washing | | | After Washing (Water) | | |
|---|---|---|---|---|---|---|
| | ICBW (g) | IOW (g) | IOW/ICBW (%) | AWBW (g) | ROWW (g) | ROWW/ICBW (%) |
| Control | 3.90 (0.13) | 1.77 (0.35) | 45.27 (8.60) | 4.09 (0.14) | 0.19 (0.03) | 4.89 (0.89) |
| Dissolved Lignin Floccule (DLFs) (0.05%) | 3.88 (0.12) | 2.36 (0.06) | 60.91 (3.21) | 3.96 (0.11) | 0.08 (0.01) | 2.17 (0.39) |
| Nano/Micro Lignin (0.04%) | 3.89 (0.09) | 2.38 (0.04) | 61.32 (2.36) | 3.99 (0.09) | 0.10 (0.01) | 2.64 (0.16) |
| LCNF (0.04%) | 3.88 (0.11) | 2.10 (0.17) | 53.97 (7.58) | 3.93 (0.12) | 0.05 (0.01) | 1.32 (0.30) |

ICBW = Initial Clean Bottle Weight;
IOW = Initial Oil Weight;
AWBW = After-Washing Bottle Weight;
ROWW = Residual Oil-Water Weight;
LCNF = Lignin-containing CNF As shown in Table 4, the oil/water contents post-washing, relative to the clean bottle weight, were 4.89%, 2.17%, 2.64%, and 1.32% for the control, DLF, NLF, and LCNFF groups, respectively. These results show the advantage of using lignin floccule formulations in removing oil contamination on plastics.

Examples 25-34. Washing Quart-Size HDPE Motor Oil Bottles

Quart-size HDPE motor-oil containers were obtained from two 5-minute oil change stations in Baton Rouge, Louisiana. The sample primarily comprised automobile engine oil containers from BP (Castrol®), and Exxon-Mobil (Mobil 1). The Castrol bottles weighed about 70 grams and the Mobil 1 bottles weighed about 57 grams on average. The Castrol bottles contained about 35 wt % residual motor oil (24 grams/bottle), and the Mobil 1 bottles contained about 17 wt % residual motor oil (9.0 grams/bottle) on average, relative to the respective clean bottle weights.

Four washing fluids (control, dissolved lignin floccules—DLFs, nano-lignin floccules—NLFs, and LCNF floccules—LCNFFs) were used. The control fluid contained water and salt (1 m or 5.85%) at pH=5, and the other three fluids were prepared as described in the above examples. Each formulation contained 1 m or 5.85% salt and 0.05% lignin, and the pH was adjusted to 5 with HCl. The bottles were washed twice. 300 mL of each formulation was added to a bottle, and the bottle was shaken by hand for 20 seconds for each wash. Each bottle was then rinsed with tap water, and dried overnight in an oven at 60° C. to remove residual water. The bottle weights (clean, with motor oil, after washing/rinsing, and after oven-drying) were used to calculate washing efficiency of the different formulations. See Tables 5 and 6.

TABLE 5

Data on cleaning BP Black Castrol bottle with dissolved lignin formulation

| | Before Washing | | | After Washing (Water) | | |
|---|---|---|---|---|---|---|
| Washing Fluids | ICBW (g) | IOW (g) | IOW/ICBW (%) | AWBW (g) | ROWW (g) | ROWW/ICBW (%) |
| Control | 70.13 (0.00) | 25.32 (5.36) | 36.10 (7.56) | 72.85 (1.39) | 2.72 (1.39) | 3.88 (1.99) |
| Dissolved Lignin Floccule-DLF (0.05%) | 70.13 (0.00) | 22.64 (4.20) | 32.99 (5.22) | 71.28 (0.94) | 1.15 (0.94) | 1.64 (1.33) |

ICBW = Initial Clean Bottle Weight;
IOW = Initial Oil Weight;
AWBW = After-Washing Bottle Weight;
ROWW: = Residual Oil-Water Weight As shown in Table 5, oil content in relation to clean bottle weight for Castrol Bottles was 3.88 and 1.64% for control and DLF groups, respectively. The data show the advantage of using lignin-containing formulations in removing oil contamination on plastics.

As shown in Table 6, oil/water content in relation to clean bottle weight for Mobil 1 bottles was 7.52, 4.17, 4.87, and 5.55% for control, DLF, NLF and LCNFF groups, respectively. The data again show the advantage of using lignin-containing formulations in removing oil contamination on plastics.

TABLE 6

Data on cleaning Exxon Grey bottle with different lignin formulation

| | Before Washing | | | After Washing (Water) | | |
|---|---|---|---|---|---|---|
| Washing Fluids | ICBW (g) | IOW (g) | IOW/ICBW (%) | AWBW (g) | ROWW (g) | ROWW/ICBW (%) |
| Control | 57.00 (0.00) | 9.51 (1.26) | 16.69 (8.01) | 61.29 (0.97) | 4.29 (0.97) | 7.52 (1.71) |
| Dissolved Lignin Floccules-DLFs (0.05%) | 57.00 (0.00) | 8.03 (2.41) | 14.08 (4.22) | 59.38 (0.98) | 2.33 (0.98) | 4.17 (1.72) |
| Nano Lignin Floccules-NLFs (0.05%) | 57.00 (0.00) | 8.22 (1.17) | 20.81 (8.02) | 59.77 (0.74) | 2.77 (0.74) | 4.87 (1.29) |
| LCNF Floccules-LCNFFs (0.05%) | 57.00 (0.00) | 9.72 (1.17) | 17.06 (2.06) | 60.16 (0.18) | 3.16 (0.18) | 5.55 (0.32) |

ICBW = Initial Clean Bottle Weight;
IOW = Initial Oil Weight;
AWBW = After-Washing Bottle Weight;
ROWW = Residual Oil-Water Weight;
LCNF = Lignin-containing CNF Another group of Mobil 1 bottles was used to study the effect of the volume of washing fluids on washing efficiency. The Mobil 1 bottles weighed about 59 grams on average. The bottles had about 35% residual motor oil (20 grams/bottle) on average, relative to the clean bottle weight. The washing fluid was prepared as in the previous examples (0.05% lignin floccules, 5.85% salt, pH 5), and used in a volume of 300, 400, 500, or 700 mL. The bottles were washed twice by shaking for 20 seconds for each wash. Each bottle was then rinsed with tap water and dried overnight in an oven at 60° C. to remove residual water. The measured weights (clean, with motor oil, after washing/rinsing, and after oven-drying) were used to determine washing efficiency. See Table 7.

TABLE 7

Measurements for residual oil (w/w) relative to the volume of washing liquid used per 950 ml bottle. (Loading capacity)

| | Before Washing | | | After Washing (Water) | | |
|---|---|---|---|---|---|---|
| Washing Fluid (mL) | ICBW (g) | IOW (g) | IOW/ICBW (%) | AWBW (g) | ROWW (g) | ROWW/ICBW (%) |
| 300 | 59.00 (0.00) | 20.78 (0.16) | 35.23 (0.29) | 61.23 (0.33) | 2.22 (0.32) | 3.78 (0.55) |
| 400 | 59.00 (0.00) | 20.65 (0.05) | 35.01 (0.10) | 59.78 (0.06) | 0.781 (0.067) | 1.32 (0.1) |
| 500 | 59.00 (0.00) | 20.29 (0.07) | 34.40 (0.12) | 60.05 (0.22) | 1.05 (0.22) | 1.7 (0.3) |
| 700 | 59.00 (0.00) | 20.30 (0.06) | 34.41 (0.10) | 59.76 (0.16) | 0.76 (0.15) | 1.29 (0.26) |

ICBW = Initial Clean Bottle Weight;
IOW = Initial Oil Weight;
AWBW = After-Washing Bottle Weight;
ROWW = Residual Oil-Water Weight The data shown in Table 7 showed that increasing the volume of washing fluid had only a limited effect beyond the 400 mL level. About 400 mL per bottle was optimal for this particular system.

A larger-scale washing study was then performed with chipped quart-type motor oil bottles (Castrol and Mobil 1) collected from local 5-minute oil change facilities in Baton Rouge, Louisiana. The bottles contained differing amounts of residual oil. Bottle weights were adjusted by adding or removing some oil in the bottle to have a similar weight of oil for each bottle type (about 20 wt % oil). The bottles were chipped using lab shears. After chipping, some free oil flowed to the bottom of the chip pile and the surfaces of the chips had varying amounts of oil. An LCNF suspension sample was made from southern pine bark, ultrasonically treated, and added to a 1 m NaCl solution to form an LCNF-saltwater suspension with 0.05% LCNF concentration. The pH of the suspension was adjusted to 5 with HCl. Ten gallons of the suspension were prepared for this study. A total of 12 batches of chipped oil bottles were washed, each with a batch weight of 150 grams. The chips were loaded in a steel-mesh container and submerged in the washing fluid with shaking. Each batch was washed twice. The washed chips were rinsed and oven-dried to get a final weight. The percentage of oil removed from each batch was measured based on initial weight before washing, and the dry weight after washing and drying. On average, 5.34% (a ratio of weight of oil removed to the weight of cleaned and dried plastics chips) was removed from chipped bottles. (I.e., this 5.34% figure represents oil that still adhered to the plastic after chipping, and that had not already flowed to the bottom of the chip pile as free oil.) The plastic surfaces were free of oil after washing.

Examples 35-39: Removing Oil an from Oil-In-Water Suspension

The novel lignin floccules may also be used to remove oil, mud, or other contaminants from oil-water mixtures.

After motor oil bottles had been washed as described in Examples 25-34 above, the oil-containing fluids with LCNF floccules were collected and stored in a glass container. After a few minutes, the lignin-oil complex floated to the top of the water-based carrier fluid. When heated, the lignin floccules transformed into an interface layer between oil and water that effectively separated the oil from water. Further heating the system led to the formation of an oil-lignin complex cake/film that floated on the oil-layer and was collected. The water stream was recovered. Samples were taken from the recovered water, and were extracted using the separatory funnel method of EPA method 8015C (EPA Method 8015C—Separatory funnel extraction, US EPA, 2007) followed by analysis using Gas chromatography (GC) and mass spectrometry, following the EPA Method (Analysis method: EPA Method 8015B, EPA, 1996) with exception of using MS in place of a flame ionization detector. The estimated total petroleum hydrocarbon (TPH) value for subnatant water was estimated at about 16.8 mg/L, showing much reduced oil content as compared >65 mg/L for the oil-water mixture immediately after washing.

We also demonstrated the removal of oil from an oil-based drilling fluid-water mixture. To test lignin floccules in cleaning oil-contaminated water from oil/gas exploration discharge, a typical commercial oil-based drilling mud was used. 10 mL (20% by volume) oil-based drilling mud was added to a 1 m NaCl solution in distilled water adjusted to pH 5 (50 ml water, pH adjusted using 0.1 N HCl). The mixture was shaken by hand to obtain an oil-in-water suspension (S1). Two (50 mL) test samples were prepared with the prepared suspension using 10 ml of a 2.14% LCNF in water (g/mL) suspension, and 10 ml 0.5% lignin in ethanol solution (g/mL). As the floccules formed in situ and then floated upwards, the subnatant was collected and used for further testing. The subnatant from LCNF and the dissolved-lignin based samples were designated as S2 and S3, respectively. Total petroleum hydrocarbon (TPH) analysis was performed for each sample. The S1, S2, and S3 samples were extracted and analyzed using the EPA method 8015C and modified EPA Method 8015B, as described for the above examples. TPH values for 51, S2, and S3 were estimated as 2522, 38.81, and 53.87 mg/L, respectively. Thus, the formulations successfully removed most of the oil from the water.

The invention may also be used to remove oil from an oil-sea water mixture, using in-situ formed floccules with sea water or brackish water. The naturally-occurring salt in the sea water can act as a flocculent. To test the in-situ formation of lignin floccules with sea water, and their ability to remove oil from an oil-sea water mixture, saline water was collected from two coastal sources: Leeville, Louisiana (brackish water), and Grand Isle, Louisiana (saltwater), USA. 2 ml of a 2.14% LCNF suspension was added to 18 ml of water from each of these two sources. The pH of each suspension was adjusted to 5 with HCl. Lignin floccules formed without adding any flocculants beyond the naturally-occurring components of salt water, particularly NaCl. The sedimentation volume (SV, the ratio of the final settled-down volume of the floccules to initial volume of the stable suspension), the redispersion time (RT, the time taken to disperse the suspension at a certain shaking speed on a shaker), and sedimentation time (ST, the time taken by a suspension to show clear supernatant fluid layer) were measured and compared. See Table 8. The data showed that both saline water samples produced well-flocculated suspension properties using LCNF material.

TABLE 8 flocculated suspension properties using LCNF material with brackish water/sea water

| Brackish Water/ Seawater Source | Salinity- total dissolved solids (g/100 mL) | Floccule Properties | | |
|---|---|---|---|---|
| | | Redis- persing time RT (seconds) | sedimen- tation volume-SV (dimen- sionless) | sedimen- tation time-ST (seconds) |
| Leeville, LA | 0.92 | 7 | 0.37 | 27 |
| Grand Isle, LA | 1.27 | 8 | 0.42 | 24 |

These formulations were used to remove oil from oil-salt water mixtures, and showed similar efficiency as with the earlier formulations we had prepared with NaCl as flocculant.

Example 40: Reusing Recovered Water, Recovered Oil/Lignin Mixture, and Recovered Plastic; Properties of the Recovered Water The pH of the water recovered from washing, after the oil-lignin complex had been removed, increased to about 6. Lignin is a weak acid and contains typically ~1% carboxylic groups (pKa ~4.5), and several percent phenolic hydroxy groups with pKa 7-8 (in structures with carbonyl conjugated with an aromatic ring) or with pKa 10-11 (typical phenolic structures). The average pKa of lignin in aqueous solution is about 10—the change in lignin chemistry as a function of pH is complex. The pKa value of the ethanol solution is 8.5. The effect of salt (NaCl) on the pH of the solution is negligible. The salinity level of the solution increased from about 5.8 to 6.1% (g/100 mL), due to the evaporation of water during heating. The increase in pH was likely due to the combination of several factors, including evaporation and incomplete precipitation of the dissolved lignin The recovered water as described above was adjusted to a pH of 5 with HCl, and a salt level of 5.8% by addition of water as needed. A processed LCNF sample was added to the water, and lignin floccules again formed, and the resulting mixture can be recycled back as a washing fluid.

Examples 41-46: Heating Value of Recovered Oil-Lignin Complex

After the motor oil bottles had been washed, the oil-containing fluids with dissolved lignin and LCNF floccules were collected and stored in separate glass containers. After a few minutes, the lignin-oil complex floated to the top of the water. Further heating (110° C., 12 h) led to the formation of a lignin-oil cake that floated on the surface of the oil layer; the oil layer in turn floated on the residual water-based fluid. The heat of combustion of this lignin oil cake was measured in an oxygen-filled bomb calorimeter, a Parr 1341 Plain Oxygen Bomb calorimeter (Moline, Illinois, USA). The samples tested included motor oil, dry LCNF powder, dry lignin, LCNF-oil cake, and the dissolved lignin-oil cake. A benzoic acid tablet (1 g, heat of combustion 26.454 KJ/g) was used as a reference standard to calibrate the thermal capacitance of the calorimeter. A specific amount of sample was loaded into the sample holder, and the calorimeter was purged five times with oxygen. The increase in temperature due to the combustion of the sample was used to calculate the heat of combustion. See Table 9. Due to the very high heat of combustion of oil, as compared to the heat of combustion for LCNF or lignin, the observed lignin/LCNF-oil complex cake heating values were considerably higher.

TABLE 9

Heating values of various materials

| Sample | Weight (grams) | Heat of Combustion (KJ/g) |
| --- | --- | --- |
| Benzoic acid (reference) | 1 | 26.45 |
| LCNF | 0.13 | 19.08 |
| Lignin | 0.35 | 25.98 |
| Motor oil | 0.91 | 48.15 |
| LCNF + Motor oil cake | 0.21 | 19.68 |
| Dissolved lignin + Motor oil cake | 0.24 | 27.56 |

Examples 47-49: Properties of Recovered Plastics

Cleaned HDPE bottles were chipped using lab shears and then ground with a lab Willy-mill to pass a 20-mesh screen. The ground material was then injection-molded into samples for ASTM testing for impact strength, bending strength, and modulus at 400° C. The samples were tested with an Instron machine, along with samples from a virgin HDPE resin (AD60 grade with 0.7 g/10 min MFI at 190° C., and 2.16 kg and density of ~0.96 g/cm$^3$ from ExxonMobil Chemical Co., USA). Observations are shown in Table 10. The recovered HDPE polymer showed comparable bending strength and stiffness as that of the virgin HDPE, and somewhat reduced impact strength. The recovered polymers can be used to make molded plastic products, either alone, or in combination with virgin or other recycled materials.

TABLE 10

Mechanical properties of recovered polymer, compared with those of a Virgin HDPE

| Material Source | Impact Strength (kJ/m$^2$) | Bending Modulus of Rupture (MOR) (MPa) | Bending Modulus of Elasticity (MOE) (GPa) |
| --- | --- | --- | --- |
| Exxon Mobil (recovered) | 9.7187 (0.1443) | 24.53 (0.75) | 0.89 (0.03) |
| BP (recovered) | 6.7374 (0.372) | 27.69 (1.04) | 0.98 (0.01) |
| HDPE AD60 (virgin) | 13.000 (1.000) | 25.72 (0.32) | 0.85 (0.00) |

Miscellaneous

The complete disclosures of all references cited in this specification are hereby incorporated by reference. Also incorporated by reference is the entire disclosure of the priority provisional patent application 63/160,039. Also incorporated by reference is the entire disclosure of provisional patent application 62/987,947, now abandoned. In the event of an otherwise irreconcilable conflict, the present specification shall control over a disclosure incorporated by reference.

We claim:

1. A process for removing oil from an oil-contaminated plastic, comprising extracting at least some oil from the oil-contaminated plastic with an aqueous composition comprising water, an electrolyte, and lignin; wherein:
    (a) the composition has a pH between 2 and 6;
    (b) the electrolyte is dissolved in the water at a concentration between 0.1 molal and 3.0 molal;
    (c) the lignin is between 0.01% and 10.0% of the composition by mass; wherein at least some of the lignin is suspended in the aqueous composition as particulates, as colloids, or as both; and
    (d) most of the lignin by mass takes the form of floccules at the pH and electrolyte concentration of the composition.

2. The process of claim 1, wherein the composition has the capacity to absorb at least 5% more oil from the oil-contaminated plastic than the oil-absorbing capacity of an otherwise-identical composition lacking lignin.

3. The process of claim 1, wherein the lignin is selected from the group consisting of soda lignin, Kraft lignin, hydrolyzed lignin, organosolv lignin, and lignosulfonates.

4. The process of claim 1, additionally comprising a carrier fluid for the lignin, wherein the carrier fluid is selected from the group consisting of ethanol, tetrahydrofuran, ethylene glycol, and dimethyl sulfoxide.

5. The process of claim 1, wherein the electrolyte is selected from the group consisting of NaCl, KCl, NH$_4$Cl, MgCl$_2$, (NH$_4$)$_2$SO$_4$, CaCl$_2$, Na$_2$SO$_4$, polygalacturonic acid, alginate, carboxymethyl cellulose, polypeptides, polyacrylic acid, polystyrene sulfonate, polyallylamine, and where applicable their respective salts.

6. The process of claim 1, additionally comprising a pH control agent selected from the group consisting of HCl, $H_2SO_4$, NaOH, KOH, acetic acid, other mineral acids, other mineral bases, and their respective buffers.

7. The process of claim 1, wherein the floccules are prepared by the process of adding lignin dissolved in a carrier fluid to an aqueous solution of the electrolyte.

8. The process of claim 1, wherein the lignin is prepared by the process of mechanical grinding, microfluidizing, or ultra-sonication.

9. The process of claim 1, wherein the lignin comprises lignin-containing cellulose nanofibers from tree bark, wood, or other plant fibers.

10. The process of claim 9, wherein the nanofibers comprise cellulose nanofibers 5 to 50 nm in diameter, and 500 nm to 10 μm in length.

11. The process of claim 9, wherein the nanofibers comprise cellulose fiber bundles 50 to 200 nm in diameter, and 200 to 1000 nm in length.

12. The process of claim 1, wherein the oil-contaminated plastic comprises used motor oil bottles.

13. The process of claim 1, additionally comprising the step, after oil has been extracted from the oil-contaminated plastic, of recycling the plastic into new plastic items of manufacture.

14. The process of claim 1, additionally comprising the steps of recovering an oil-lignin complex after said oil extraction, and combusting the recovered oil-lignin complex as a heating fuel.

15. The process of claim 1, wherein at least some of the lignin is dissolved in the aqueous composition.

\* \* \* \* \*